(12) United States Patent
Waldron (10) Patent No.: US 7,749,360 B2
(45) Date of Patent: Jul. 6, 2010

(54) VAPOR BASED LIQUID PURIFICATION SYSTEM AND PROCESS

(76) Inventor: Wesley K. Waldron, 106 St. Stephens La., Scotia, NY (US) 12302

( * ) Notice: Subject to any disclaimer, the term of this patent is extended or adjusted under 35 U.S.C. 154(b) by 1094 days.

(21) Appl. No.: 11/398,291

(22) Filed: Apr. 5, 2006

(65) Prior Publication Data

US 2007/0235317 A1    Oct. 11, 2007

(51) Int. Cl.
  *B01D 1/10* (2006.01)
  *B01D 1/28* (2006.01)
  *B01D 3/06* (2006.01)

(52) U.S. Cl. .................. 202/182; 159/2.1; 159/24.1; 159/24.3; 159/44; 159/DIG. 16; 159/6.1; 202/185.3; 202/205; 202/236; 202/238

(58) Field of Classification Search ............ 159/2.1, 159/6.1, 24.1, 24.3, 44, DIG. 13, DIG. 16; 202/182, 185.3, 205, 236, 238; 62/498
See application file for complete search history.

(56) References Cited

U.S. PATENT DOCUMENTS

| | | | | |
|---|---|---|---|---|
| 4,319,965 A | * | 3/1982 | Parker | 202/205 |
| 4,344,479 A | * | 8/1982 | Bailey | 165/109.1 |
| 5,398,519 A | * | 3/1995 | Weber et al. | 62/201 |
| 5,474,043 A | * | 12/1995 | Mallen | 123/241 |
| 6,485,022 B1 | * | 11/2002 | Fedorovich | 277/303 |
| 6,688,865 B1 | * | 2/2004 | Matsumoto et al. | 418/145 |
| 7,465,375 B2 | * | 12/2008 | Demers et al. | 202/160 |
| 7,597,784 B2 | * | 10/2009 | Bednarek et al. | 203/1 |
| 2007/0017192 A1 | * | 1/2007 | Bednarek et al. | 55/405 |

* cited by examiner

*Primary Examiner*—Virginia Manoharan
(74) *Attorney, Agent, or Firm*—Cantor Colburn LLP (57) ABSTRACT

A vapor based liquid purification system and process utilizes an evaporator for evaporating a liquid into a vapor and a vapor condenser for condensing the vapor into the processed liquid. The vapor condenser has a stator and a rotor, with the rotor disposed for rotation about the stator. The stator and the rotor each have protrusions proximate to an inlet of the vapor condenser. These protrusions cooperate to draw vapor from the evaporator into the vapor condenser. The stator and the rotor each further have at least one axially extending ridge. These ridges cooperate to move a mixture of the vapor and the processed liquid towards at least one drain in the rotor where the processed liquid is communicated to an outlet of the vapor condenser. A multi-level vapor based purification system may also be utilized. With the multi-level vapor based purification system a vertically oriented conduit provides fluid communication between a vented vessel containing liquid and the evaporator, which is at a height greater than the vented vessel such that the vertically oriented conduit has a length effective to create a low-pressure region within the evaporator.

16 Claims, 6 Drawing Sheets

VAPOR BASED LIQUID PURIFICATION SYSTEM AND PROCESS

BACKGROUND OF THE INVENTION

The present disclosure generally relates to vapor based liquid purification, and more particularly, to a vapor based liquid purification system and process employing a vapor condenser and an evaporator.

There are numerous processes and systems utilized for vapor based purification of liquids. For example, distillation (i.e., evaporation) processes of liquid water generally include the collection of condensed steam produced by boiling water. Most contaminants do not vaporize and, therefore, do not pass to the condensate (also called distillate). With a properly designed still, removal of both organic and inorganic contaminants, including biological impurities and pyrogens, can be attained. Distillation generally involves a phase change which, when properly carried out, removes all impurities down to a range of 10 parts per trillion, thereby producing water of extremely high purity. Careful temperature monitoring is generally required to ensure purity and avoid contamination of the processed water.

On a small scale, such water distillation processes may simply comprise boiling of contaminated water at a controlled temperature, e.g., in a flask, followed by funneling the water vapor into a collection area. Such collection area may be a second flask maintained at a low temperature (e.g., 32° F.), for example. The colder temperatures serve to change the phase, of the water vapor to a liquid state.

Evaporation of contaminated water and recovery of uncontaminated water may also take place on larger scales. In one exemplary application, contaminated source water is contained within an evaporator in a vacuum flash evaporation system. Water vapor from the vacuum flash evaporation process is funneled to condensing and collection devices, and uncontaminated water is recovered in the collection device.

While vapor evaporation and recovery processes are generally known, there still remains a need for improvement in generating, handling, and condensing of the vapor.

BRIEF SUMMARY OF THE INVENTION

A purification system in accordance with an exemplary embodiment of the invention is presented. An evaporator disposed in an evaporator housing that has an inlet and an outlet. The evaporator evaporates a liquid into a vapor. The inlet of the evaporator housing receives the liquid and the outlet of the evaporator housing delivers the vapor. A vapor condenser disposed in a vapor condenser housing that has an inlet and an outlet. The vapor condenser condenses the vapor into the processed liquid. The inlet of the vapor condenser housing is in communication with the outlet of the evaporator housing for receiving the vapor. The outlet of the vapor condenser housing discharges a processed liquid. The vapor condenser includes a stator having a protrusion proximate to the inlet of the vapor condenser housing. The stator further includes at least one ridge extending axially along a length of the stator. The vapor condenser also includes a rotor disposed for rotation about the stator. The rotor includes a protrusion proximate to the inlet of the vapor condenser housing. The protrusion of the rotor cooperates with the protrusion of the stator to draw the vapor from the evaporator into the vapor condenser. The rotor further includes at least one ridge extending axially along a length of the rotor. The ridge of the rotor cooperates with the ridge of the stator to move a mixture of the vapor and the processed liquid towards at least one drain in the rotor where the processed liquid is communicated to the outlet of the vapor condenser housing.

A process for purifying a liquid in accordance with an exemplary embodiment of the invention is presented. The process includes evaporating a liquid into a vapor and rotating a rotor about a stator within a condenser to condense the vapor. The rotor and the stator include protrusions that cooperate to draw the vapor into the condenser as the rotor rotates. The rotor and the stator further include ridges that cooperate to move a mixture of the vapor and a processed liquid toward a drain of the condenser. The process further includes delivering the processed liquid.

A vapor condenser in accordance with an exemplary embodiment of the invention is presented. A stator and a rotor are disposed in a housing having an inlet receptive to a vapor and an outlet for discharging a processed liquid. The stator includes a protrusion proximate to the inlet and at least one ridge extending axially along a length of the stator. The rotor is disposed for rotation about the stator. The rotor includes a protrusion proximate to the inlet. The protrusion of the rotor cooperates with the protrusion of the stator to draw the vapor into the inlet of the housing. The rotor further includes at least one ridge extending axially along a length of the rotor. The ridge of the rotor cooperates with the ridge of the stator to move a mixture of the vapor and the processed liquid towards at least one drain in the rotor where the processed liquid is communicated to the outlet of the housing.

A multi-level vapor based purification system in accordance with an exemplary embodiment of the invention is presented. A vented vessel is receptive to a liquid. An evaporator includes a sealed housing having an inlet and an outlet. A vertically oriented conduit provides fluid communication between the vented vessel and the inlet of the evaporator. The evaporator is at a height greater than the vented vessel such that the vertically oriented conduit has a length effective to create a low-pressure region within the evaporator. A vapor condenser includes a sealed housing having an inlet and an outlet. The inlet of the housing of the vapor condenser is in fluid communication with the outlet of the housing of the evaporator for receiving the vapor. The outlet of the housing of the vapor condenser discharges a processed liquid.

The above discussed and other features and advantages of the present system will be appreciated and understood by those skilled in the art from the following detailed description and drawings.

BRIEF DESCRIPTION OF THE DRAWINGS

Referring now to the figures, which are exemplary embodiments and wherein the like elements are numbered alike.

DETAILED DESCRIPTION OF THE PREFERRED EMBODIMENT

Figure 1:
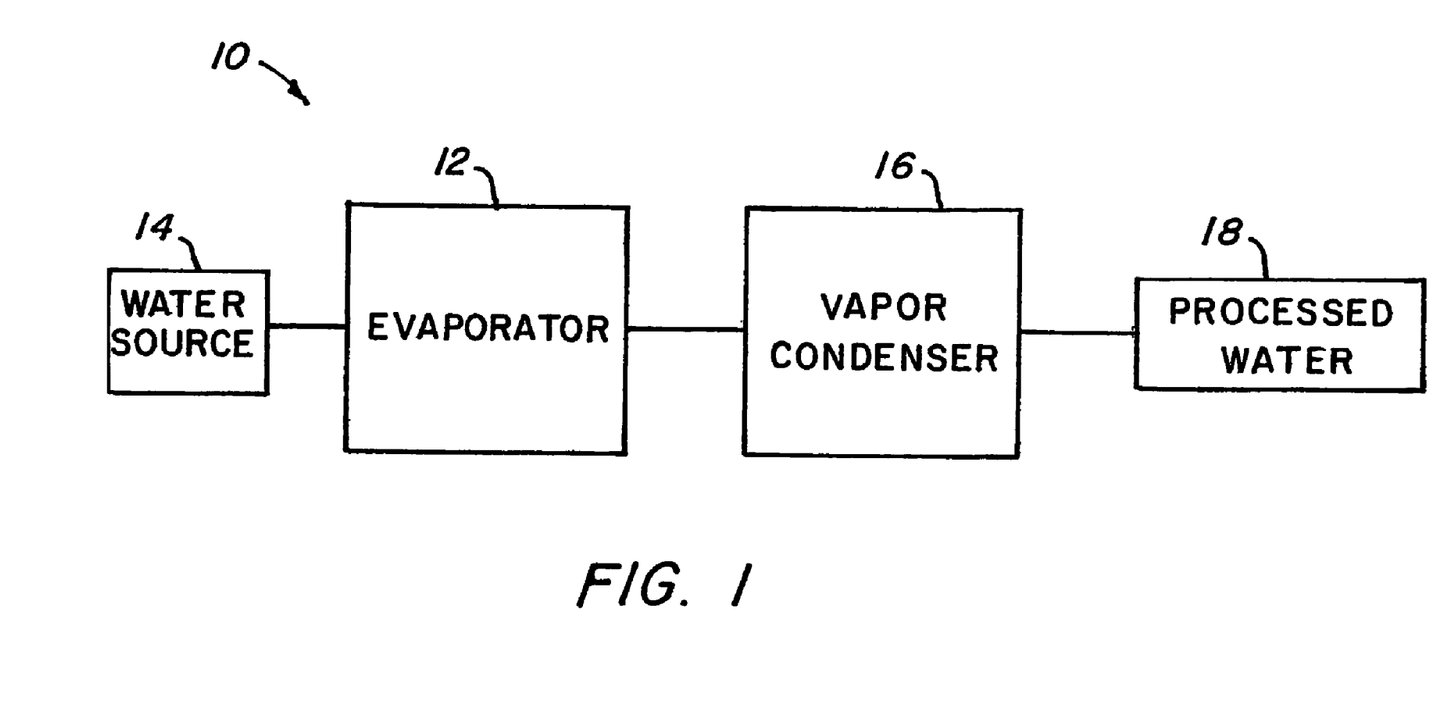
FIG. 1 is a diagrammatic view of a vaporizing and condensing purification system of the present invention.

Referring now to FIG. 1, there is shown an exemplary vapor based purification system (i.e., a vaporizing and condensing purification system) generally designated by a reference numeral 10. For ease of discussion, reference will be made to vapor based purification systems and processes as it relates to water purification. However, it should be noted that the nature of the liquid employed in the vapor based purification system is not intended to be so limited.

The illustrated vapor based purification system 10 generally includes a low-pressure enclosed evaporator 12 in fluid communication with a water source 14 and a separately enclosed vapor condenser 16. In its most simplistic form, liquid, e.g., liquid water, is fed into the low-pressure enclosed evaporator 12 from the liquid source 14, wherein the liquid water is flash evaporated to a vapor leaving behind contaminants that may have been present in the liquid water. The vapor is then drawn into the vapor condenser 16, wherein the vapor condenser 16 condenses the vapor to a processed liquid, which is then passed onto a processed liquid collector 18, thereby overall providing a means for removing contaminants from the liquid source. As will be described in greater detail below, the vapor condenser 16, because of its unique structure provides multiple functions including, but not limited to, establishing and maintaining a low pressure in the evaporator 12, drawing vapor from the evaporator 12 and into the vapor condenser 16, compressing the vapor, condensing the vapor, increasing the water pressure via centrifugal force, and collecting the processed water in the condenser enclosure and passing it out a drain to the processed water collector 18, where it can be used or stored in the manner desired.

Figure 2:
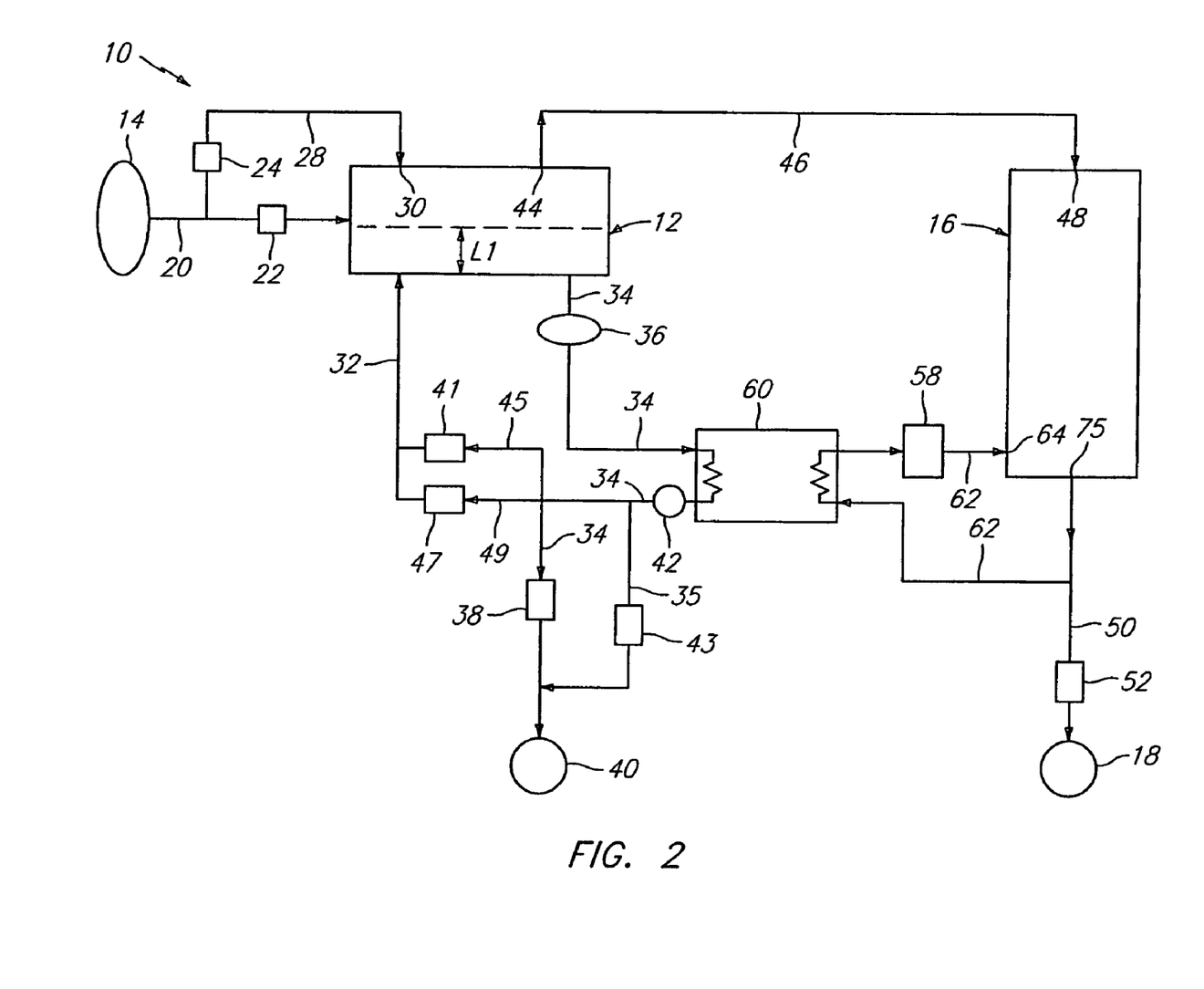
FIG. 2 is a more detailed diagrammatic view of the vaporizing and condensing purification system of FIG. 1.

The illustrated vapor based purification system 10 is exemplary only and is not intended to be limited to the specific embodiments described herein. The system may include various loops, sensors, spray valves, control valves, heat exchangers, and the like to further optimize the production of purified liquid (e.g., water) depending on the particular application. FIG. 2 further details exemplary vapor based purification system 10, wherein such is described with reference to water purification.

Referring to FIG. 2, a valve 22 controls water flow from the water source 14 to the evaporator 12 via a conduit 20. A diverter valve 24 and an optional pump (not shown) is provided in a conduit 28 to permit the flow of water as a fine spray via spray nozzles 30 into the evaporator 12, as may be desired for some applications. In an alternative embodiment, the water source for the spray nozzles 30 is an additional water source, i.e., other than water source 14. The water level L1 in the evaporator 12 is sensed and controlled by valve 22. The evaporator 12 has a vapor outlet 44 in fluid communication, via a conduit 46, with a vapor inlet 48 of the vapor condenser 16.

The evaporator 12 further includes feedback loops through which paths of water flow are defined. Flow can be fed back through conduit 34, a liquid-to-liquid heat exchanger 60, conduit 45, valve 41, and conduit 32 in one of the feedback loops of the evaporator 12. Water is circulated through this feedback loop and valve 41 is manually set to minimize and/or reduce the buildup of sediment or scaling material in the evaporator 12. A sensor 36 is disposed in conduit 34 for detecting the contaminant concentration in the liquid water contained in the evaporator and provides an output signal to proportionally open or close a valve 38 in conduit 34 to drain contaminated water from the evaporator 12 through conduit 34 and heat exchanger 60 to a waste water collector 40. Also, flow can be fed back through conduit 34, heat exchanger 60, a conduit 49, a valve 47, and conduit 32, defining the other one of the feedback loops of the evaporator 12. The valve 47 is proportionally controlled by a temperature sensor (not shown) in the evaporator 12 (disposed for sensing the temperature of the water therein) to control or regulate the temperature of the water in the evaporator 12. As will be described in more detail below, vapor is drawn from the evaporator 12 into the vapor condenser 16 upon operation thereof. The drawn vapor is condensed within the vapor condenser 16 and discharged through a conduit 50 at an outlet 75 as controlled by a pressure relief valve 52 to the processed water collector 18. A pump 42 is disposed in conduit 34 to facilitate circulation through the feedback loops and to drain contaminated water from the evaporator 12.

Conduit 35 is in fluid communication with conduit 34 at one end near the outlet of pump 42 and at the other end near the inlet of collector 40. Conduit 35 further includes a valve 43, which is controlled by a temperature sensor (not shown) disposed at the output of valve 58 in the feedback loop of the vapor condenser 16 as defined by conduits 62, and is discussed in greater detail below. Valve 43 provides vernier temperature control and system redundancy in the event that valves 38 and 47 are partially or fully closed.

As mentioned above, the vapor condenser 16 includes a feedback loop for processed spray. Conduits 62 generally define this feedback loop. Valve 58 and heat exchanger 60 are disposed in conduits 62, which is in fluid communication with conduit 50. Spray nozzles 64 are fed by conduits 62 and are in fluid communication with the vapor condenser 16, as is discussed more fully below. The flow of fine water spray into the vapor condenser 16 is controlled by valve 58. The fine spray from nozzles 64 is adapted to provide a fine cooling water mist or water spray into the vapor condenser 16 so as to thermally and physically interact with and condense vapor molecules to form additional liquid. The accumulated spray water and condensed water vapor is then either fed into conduit 50 and via pressure control valve 52 the processed water collector 18 or fed back via conduits 62.

Turning now to FIGS. 3-6, there are shown detailed cross sectional and partial perspective views of the vapor condenser 16. The vapor condenser 16 generally includes a fan (or an axial bucket compressor), discussed hereinafter, a rotor 70, and a stator 72 enclosed within a sealed housing 74, wherein the rotor 70 rotates around the stator 72 to form a dynamic system. The housing 74 includes inlet 48 in fluid communication with the evaporator 12 (see FIG. 2) and outlet 75.

Figure 3:
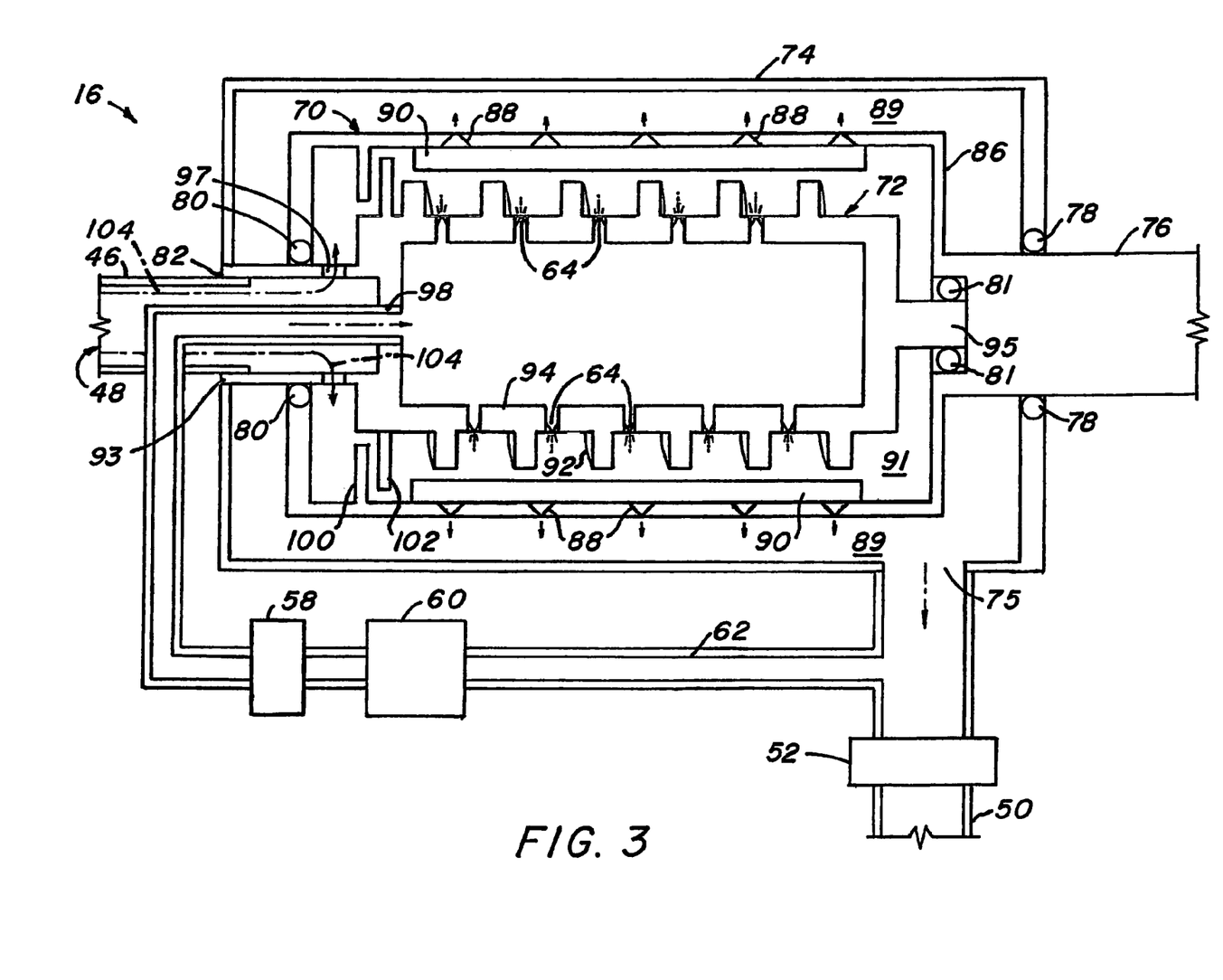
FIG. 3 is a diagrammatic view of a vapor condenser of the system of FIG. 2.

The rotor 70 is driven by a drive shaft 76, which is coupled via a sealed bearing 78 to one end of the housing 74. Bearing 78 coupled with a bearing 80 proximate the other end of housing 74 provide rotational support of the rotor 70 within the housing 74, whereas a bearing 81 towards an end of drive shaft 76 provides support of the stator within the drive shaft 76. The bearings 78, 80, 81 are sealed (e.g., sealed shaft bearings) or otherwise disposed as may be desired for the particular application. Likewise, the various interfaces (e.g., 82) between the housing 74, the inlet conduit 46 and the stator 72 are sealed or bonded to prevent loss of vapor, vapor pressure, and/or liquid from the vapor condenser during use. This bonded interface also provides support for conduit 46 and stator 72 by housing 74.

The illustrated rotor 70 includes a wall 86 extending from the drive shaft 76, wherein the wall 86 forms a cylindrical-like structure about the stator 72. The wall 86 includes one or more drains 88 laterally disposed along a length of the rotor and further include numerous ridges 90 (two of which are shown in FIG. 3) projecting from and laterally extending inward along the length of the rotor 70, as is clearly shown in FIGS. 4 and 5. In this exemplary embodiment, the one or more drains 88 are conically shaped to facilitate centrifugal pressure enhancing discharge of liquid into a space 89 intermediate the rotor 70 and the housing 74. In an alternative embodiment, the one or more drains 88 further include a valve (not shown) to prevent backflow of liquid from space 89 into a space 91, the latter which is intermediate the rotor 70 and the stator 72.

Figure 4:
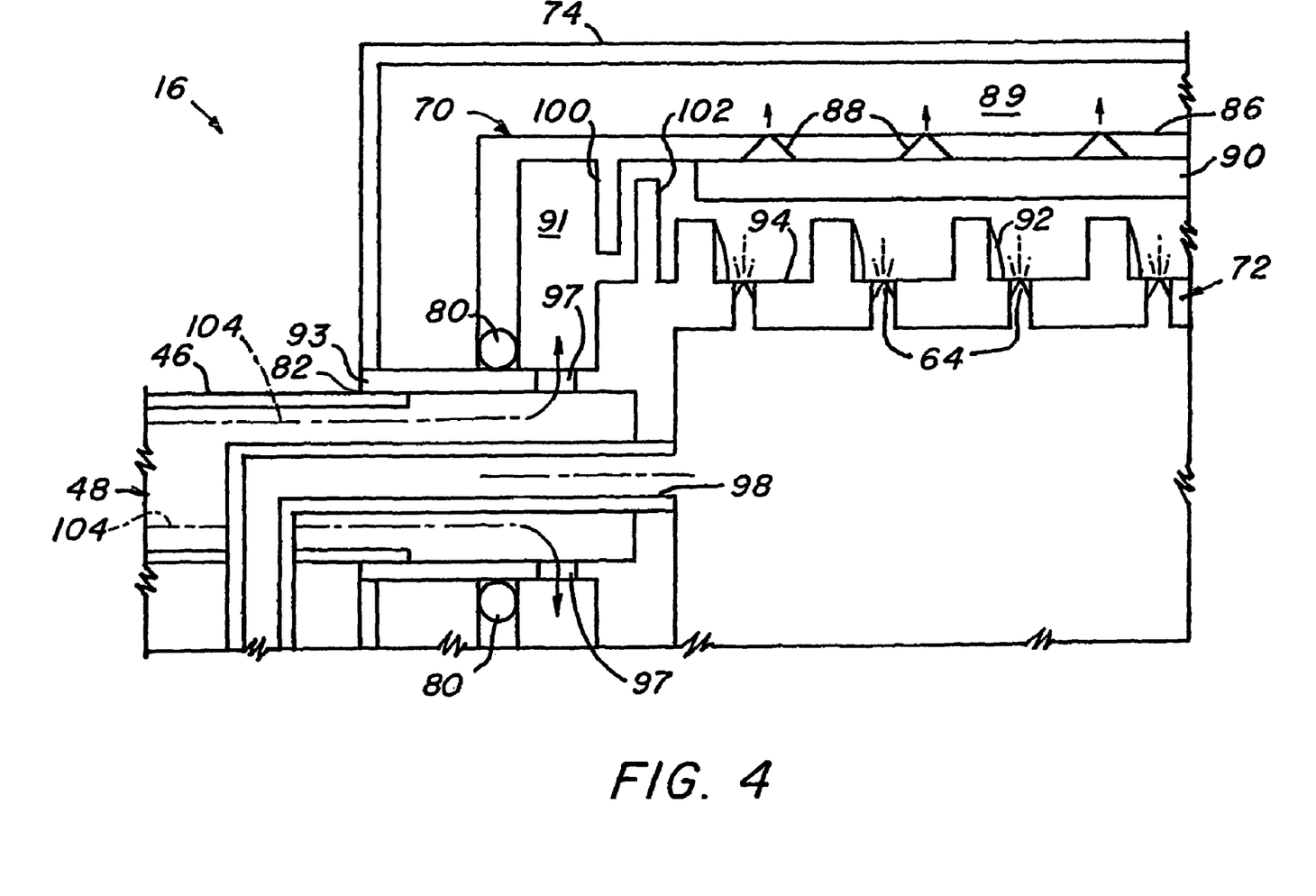
FIG. 4 is an enlarged partial sectional view of the vapor condenser of FIG. 3.
Figure 6:
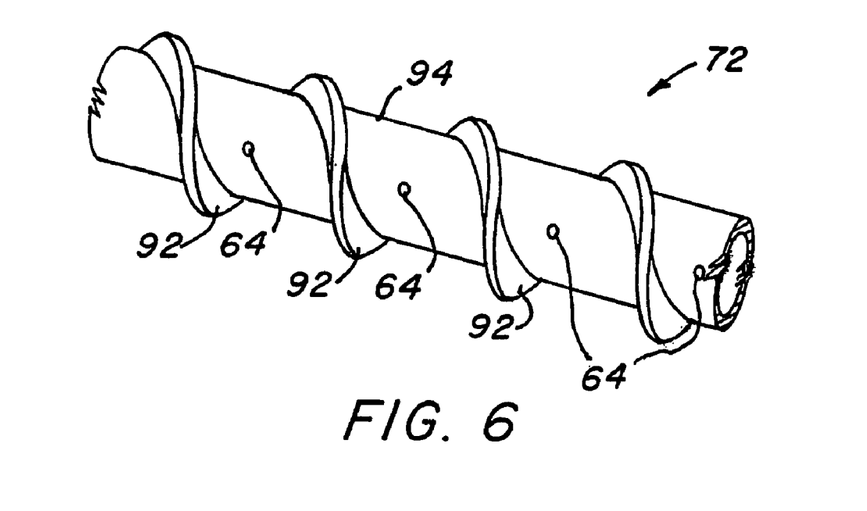
FIG. 6 is a perspective view of a stator component of the vapor condenser of FIG. 3.

The stator 72 includes a spiral ridge 92, which is shown in FIGS. 4 and 6, extending outwardly about a hollow sealed cylindrical shaped body 94 of the stator 72. The spiral ridge 92 of the stator 72 is oriented and structured to assist in cooperation with the ridges 90 of the rotor 70 in moving vapor and fluid, as the rotor 70 rotates, from the inlet 48 towards the outlet 75 of the vapor condenser 16. The spiral ridge 92 is illustrated as one continuous ridge extending the length of the stator body 94. The stator body 94 includes one end 93 that is bonded to the housing 74 at inlet 48 and another end 95 that is seated via sealed shaft bearing 81 within a recess defined by rotor drive shaft 76. End 93 has at least one opening 97 defined therein, which is in fluid communication with space 91 and a vapor outlet (not shown) of the evaporator 12. As previously noted, space 91 is intermediate the rotor 70 and the stator 72. The number and dimensions of the ridges are not intended to be limited.

Figure 5:
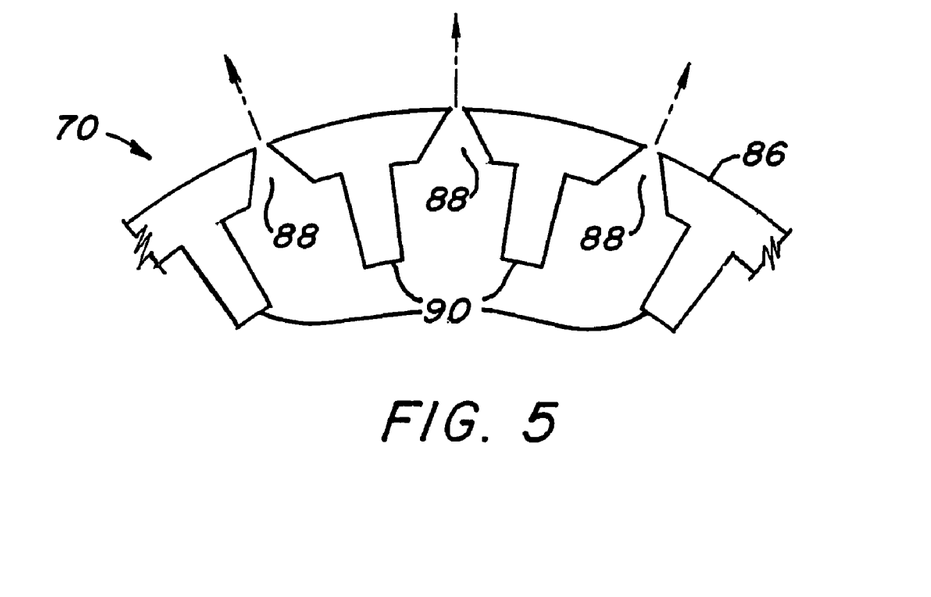
FIG. 5 is a cross sectional view of a rotor component of the vapor condenser of FIG. 3.

The rotor ridges 90 in conjunction with the stator ridge 92 assist in moving the mixture of vapor and water present in the condenser 16 from the inlet 48 toward the outlet 75 as the rotor 70 rotates about the stator 72. The ridges 90 are linearly disposed around the inner circumference of and extend inward of the wall 86 of the rotor 70. The number, dimensions, shape, and design of the ridges are not intended to be limited so long as rotation of the rotor 70 is not impeded by contact with the stator 72.

The stator 72 further includes one or more fine spray nozzles 64 (shown more clearly in FIGS. 3, 4, and 6) in fluid communication with the space 91, and as shown, are located intermediate the projections provided by the spiral ridge 92. The fine spray nozzles 64 are not intended to be limited to the specific location shown and may be disposed in the spiral ridge 92 itself, if desired. Likewise, the number of fine spray nozzles is not intended to be limited to those shown and can be varied in number and location as may be desired for different applications. The fine spray nozzles 64 are adapted to provide a fine water mist or water spray into the space 91 between the rotor 70 and the stator 72 so as to thermally and physically interact with and condense vapor molecules to form additional liquid. The fine spray emitted from the nozzles 64 serves to minimize the potential and kinetic energy associated with the vapor molecules. The accumulated spray water and condensed water vapor are centrifugally forced through drain holes 88, which can then be fed back from the outlet 75 through the feedback loop generally defined by conduits 62 to supply processed pure water to the fine spray nozzles 64 as may be desired or may be discharged into processed liquid collector 18 as the product of the vapor purification system, namely as processed pure water. The stator 72 includes a sealed hollow interior region that can be pressurized with water from the feedback loop defined by conduits 62 to emit the desired spray pattern and amount via nozzles 64 into space 91.

Extending from the rotor 70 and the stator 72 are numerous protrusions 100, 102, respectively, positioned proximate to the end at inlet 48 of the housing 74. The rotor protrusions 100 act as a fan or interact with stator protrusions 102 to act as a bucket compressor, thereby forming the rotational and stationary parts of the axial compressor. Both the fan and the compressor function to pull or draw the vapor from the evaporator 12. In addition, the bucket compressor creates and maintains a low vapor pressure in the evaporator 12 by pulling or drawing air and/or vapor from the evaporator 12 as indicated by vapor flow arrows 104 into the vapor condenser 16. The disclosure related to the axial compressor is not intended to be limited to the particular axial compressor as shown. For example, the rotor 70 and the stator 72 can include multistage opposing axially dispersed compressor buckets that function in a similar manner as may be desired for some applications.

The feedback loop defined by conduits 62 is in fluid communication with the outlet 75 and the fine spray nozzles 64. The feedback loop further includes valve 58 that is manually set to regulate the amount of water fed to the fine spray nozzles from the outlet conduit 50. The heat exchanger 60 is included within the feedback loop provides a means of extracting thermal energy from the flow through conduit 62 to enhance condensation.

The presently described vapor condenser 16 may be used in a vapor based purification system with any of a variety of aspects. In a simple form, the system exhibits minimal pressure and temperature difference and requires only a few close tolerance parts which holds manufacturing and subsequent maintenance costs at a minimum. By way of example, a simple design may be configured which allows a single motor to provide all of the rotation power required for the compression, condensation and collection sections. That being said, the design may be scaled to any desired application, and any individual aspects may be configured to fit such application. Design variables include the length and/or diameter of the rotor and stator, the fan blades or bucket type compressor, including size, revolutions per minute, number of stages, etc., the rotor revolutions per minute, the number, pitch and/or clearance of the rotor and/or stator ridges, the configuration of a liquid line heat exchange, the volume of feedback liquid supplied to the condensation section, the number and placement of fine spray nozzles or the aperture permitting introduction of liquid into the condensation section, any spray pattern the liquid being introduced into the condensation section may have, and the number, shape, size or position of rotor drain outlets. Further, any of the variable aspects of the system may be computer controlled.

Exemplary applications include stand-alone vapor to liquid processes; situations where it may be desirable to condense steam to return liquid to boilers, and the like; water processes which produce water vapor (e.g., from an evaporator); and flash water evaporation processes for, e.g., single family/multi-family residences, industrial plants, community water systems, ships/oil rigs, remote location where wells, lakes or rivers are available, and mobile (e.g., military) equipment.

Figure 7:
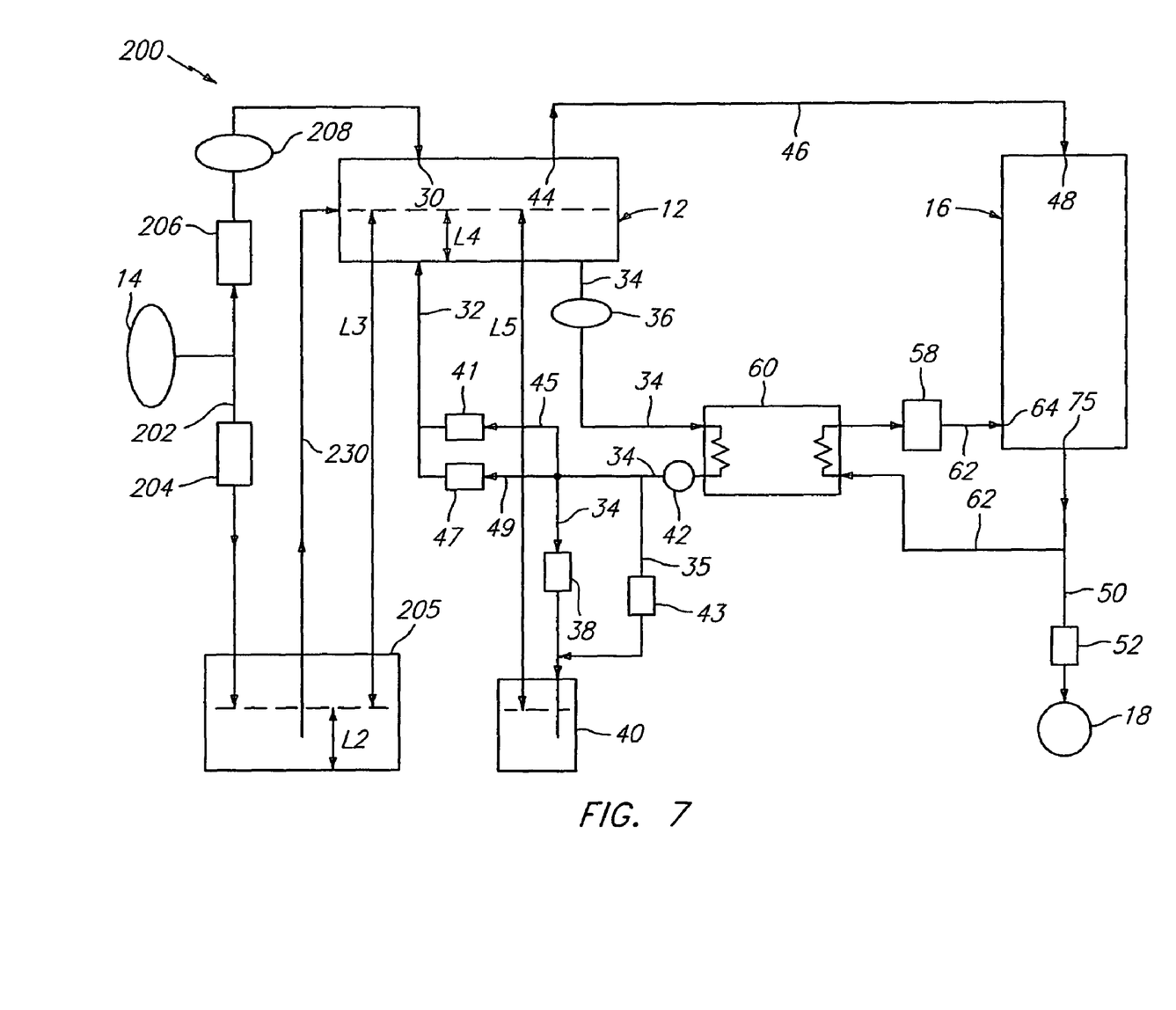
FIG. 7 is a diagrammatic view of a multilevel vaporizing and condensing purification system of the present invention.

FIG. 7 illustrates a schematic of an exemplary multilevel vapor based purification system 200 suitable for use in areas subject to varying topography, e.g., hills, buildings, ships, and the like. For these applications, the illustrated system can take advantage of the natural laws of physics. For example, atmospheric pressure at sea level will support approximately thirty-four vertical feet of water in a closed tube. In view of this, a low vacuum can be created in the enclosed evaporator 12 and maintained therein without the need for an external vacuum apparatus provided all generated vapor is withdrawn via outlet 44 and conduit 46.

The illustrated system 200 generally includes the evaporator 12 and the vapor condenser 16 as previously described in fluid communication therewith. The liquid to be subject to evaporation is introduced from the source 14 and into the system 200 via a conduit 202. A control valve 204 is used to regulate the flow rate of the contaminated liquid into a vessel 205. Vessel 205 is vented to the atmosphere and is in fluid communication with the evaporator 12. The level of liquid L4 in the evaporator 12 is related to the level of liquid L2 in the vented vessel 205 by a difference in the vertical length L3. A vertically oriented conduit 230 extends at the lower end into the liquid in the vented vessel 205 and at the upper end into the liquid in the evaporator 12, thereby causing conduit 230 to be sealed from the atmosphere at each end by the corresponding liquid. This design recognizes that atmospheric pressure will support approximately thirty-four vertical feet of water in a sealed tube, in-this case conduit 230. A vacuum will exist in any space in the sealed tube above that level. Using this principle, a vacuum is maintained in the evaporator 12 without the need of other means for creating a low vacuum condition within the evaporator 12 assuming the removal of generated vapor. The level of water L2 in the vented vessel 205 is regulated via regulating valve 204 to maintain the level L4 in the evaporator 12, as a result of the liquid in the vented vessel 205 being drawn through the conduit 230 into the evaporator 12, such being attributed to the low vacuum condition within the evaporator 12. In this manner, a minimum or optimal level of liquid L4 for flash evaporation can be maintained.

Flow control valve 38 is configured to regulate the flow of wastewater through approximately thirty-four feet (level L5) of vertical conduit 34 to vessel 40 controlled by sensor 36 (e.g., as a function of the percent contamination in the evaporator fluid). The pump 42 facilitates circulation through the feedback loops and drains contaminated water from the evaporator 12.

The evaporator outlet 44 is in fluid communication with inlet 48 to the vapor condenser 16, which as previously described draws vapor generated within the evaporator 12 into the vapor condenser 16. The system 200 may further include a second flow control valve 206 and a low-pressure pump 208 for spraying liquid from the source 14 or an alternative source through spray nozzles 30 into the evaporator 12 as may be desired for some applications.

Operation of system 200 is similar to the application described above with regard to system 10 of FIGS. 1-6, except that the contaminated water inlet is configured to take advantage of the physical level differences (discussed above) between various components, such as may occur in buildings, ships and uneven terrains. During operation of the vapor condenser 16, a vapor to liquid phase change occurs, wherein any liquid that is generated centrifugally flows through rotor drains 88 (see FIGS. 3-6), a portion of which can then be fed through the vapor condenser feedback loop defined by conduits 62 as previously described. Liquid as processed water that is not directed into the feedback loop is passed through vapor condenser outlet 75 and conduit 50 as permitted by liquid flow control valve 52 (which may be configured to regulate flow, e.g., as a function of liquid pressure in the vapor condenser 16). The processed water can be used directly or stored in storage tank 18 for later use.

The above-described exemplary systems advantageously include configurable flow rates, heat exchange parameters, rotor speeds, and other system elements, any of which may be computer controlled and/or regulated based on sensors within the system. For example, in system 200, the level L4 of contaminated water within the evaporator 12 may be regulated to ensure optimal performance of the evaporator (e.g., the contaminated water in the evaporator is maintained at a depth L4 so that an advantage is realized with regard to the boiling of water at depth within the water as well as with regard to surface flash boiling). Also, wastewater may be discharged from the evaporator 12 based on a sensed concentration of waste in the water contained in the evaporator (e.g., when the percent concentration exceeds a preset criteria, the discharge of wastewater may be proportionally increased). Finally, the vapor condenser 16 may be positioned or configured such that heat from the vapor condenser is passed back into the evaporator 12 via the liquid-to-liquid heat exchanger 60 to enhance the performance and efficiency of both evaporator and condenser.

Advantageously, the vapor condenser 16 is suitable for use in systems such as the water purification system described herein, as a low cost alternative to similar functions in existing condenser systems, and also provides a low pressure and low temperature solution as compared to other types of condensers. The vapor condenser 16 is relatively easy to manufacture, install, operate, and maintain.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A vapor based purification system, comprising:
   an evaporator having an inlet and an outlet,
   the inlet of the evaporator for receiving the liquid and the outlet of the evaporator for delivering the vapor;
   a vapor condenser housing having an inlet and an outlet, the inlet of the vapor condenser housing in communication with the outlet of the evaporator for receiving the vapor, the outlet of the vapor condenser housing for discharging a processed liquid; and
   a vapor condenser disposed in the vapor condenser housing, comprising,
      a stator including a protrusion proximate to the inlet of the vapor condenser housing, the stator further including at least one ridge extending axially along a length of the stator;
      a rotor disposed for rotation about the stator, the rotor including a protrusion proximate to the inlet of the vapor condenser housing, the protrusion of the rotor cooperating with the protrusion of the stator to draw the vapor from the evaporator into the vapor condenser, the rotor further including at least one ridge extending axially along a length of the rotor, the ridge of the rotor cooperating with the ridge of the stator to move a mixture of the vapor and the processed liquid towards at least one drain in the rotor where the processed liquid is communicated to the outlet of the vapor condenser housing;
   a feedback loop in fluid communication with the outlet of the vapor condenser and the stator; and
   wherein the stator further includes at least one spray nozzle for spraying the processed liquid towards the rotor.

2. The system of claim 1, wherein the at least one drain has a conical shape.

3. The system of claim 1, further comprising:
a heat exchanger in thermal communication with the processed liquid flowing through the feedback loop.

4. The system of claim 1, wherein the rotor further includes a valve for preventing backflow the at least one drain.

5. The system of claim 1, wherein the at least one ridge of the stator has a spiral shape.

6. The system of claim 1, wherein the evaporator comprises a flash evaporator.

7. The system of claim 1, further comprising:
a valve disposed at the outlet of the evaporator for selectively discharging liquid in the evaporator.

8. The system of claim 7, further comprising:
a sensor for detecting a concentration of contaminants in the liquid at the evaporator and communicating with the valve to discharge the liquid in the evaporator when the concentration of the contaminants exceeds a specified level.

9. The system of claim 1, wherein the protrusion of the rotor and the protrusion of the stator cooperate to define a bucket compressor.

10. The system of claim 1, wherein the protrusion of the rotor defines a fan.

11. The system of claim 1, wherein the evaporator further includes a waster water collector feedback loop configured to reduce sediment or scaling material in the evaporator.

12. The system of claim 1, wherein the evaporator further includes a cooling water feedback loop configured to enhance evaporation.

13. A vapor based purification system, comprising:
a vented vessel receptive to a liguid;
an evaporator having an inlet and an outlet;
a vertically oriented conduit providing fluid communication between the vented vessel and the inlet of the evaporator, the evaporator is at a height greater than the vented vessel such that the vertically oriented conduit has a length effective to create a low pressure region within the evaporator;
a vapor condenser comprising a sealed housing having an inlet and an outlet, the inlet of the housing of the vapor condenser in fluid communication with the outlet of the housing of the evaporator for receiving the vapor, the outlet of the housing of the vapor condenser for discharging a processed liguid;
a stator disposed in the housing of the vapor condenser, the stator including a protrusion proximate to the inlet of the housing of the vapor condenser, the stator further including at least one ridge extending axially along a length of the stator;
a rotor disposed in the housing of the vapor condenser for rotation about the stator, the rotor including a protrusion proximate to the inlet of the housing of the vapor condenser, the protrusion of the rotor cooperating with the protrusion of the stator to draw the vapor from the evaporator to the vapor condenser, the rotor further including at least one ridge extending axially along a length of the rotor, the ridge of the rotor cooperating with the ridge of the stator to move a mixture of the vapor and the processed liquid towards at least one drain in the rotor where the processed liquid is communicated to the outlet of the housing of the vapor condenser; and
wherein the at least one ridge of the stator has a spiral shape.

14. A vapor based purification system, comprising:
a vented vessel receptive to a liquid;
an evaporator having an inlet and an outlet;
a vertically oriented conduit providing fluid communication between the vented vessel and the inlet of the evaporator, the evaporator is at a height greater than the vented vessel such that the vertically oriented conduit has a length effective to create a low pressure region within the evaporator;
a vapor condenser comprising a sealed housing having an inlet and an outlet, the inlet of the housing of the vapor condenser in fluid communication with the outlet of the evaporator for receiving the vapor, the outlet of the housing of the vapor condenser for discharging a processed liquid;
a stator disposed in the housing of the vapor condenser, the stator including a protrusion proximate to the inlet of the housing of the vapor condenser, the stator further including at least one ridge extending axially along a length of the stator;
a rotor disposed in the housing of the vapor condenser for rotation about the stator, the rotor including a protrusion proximate to the inlet of the housing of the vapor condenser, the protrusion of the rotor cooperating with the protrusion of the stator to draw the vapor from the evaporator to the vapor condenser, the rotor further including at least one ridge extending axially along a length of the rotor, the ridge of the rotor cooperating with the ridge of the stator to move a mixture of the vapor and the processed liquid towards at least one drain in the rotor where the processed liquid is communicated to the outlet of the housing of the vapor condenser; and
wherein the protrusion of the rotor and the protrusion of the stator cooperate to define a bucket compressor.

15. A vapor based purification system, comprising:
a vented vessel receptive to a liquid;
an evaporator having an inlet and an outlet;
a vertically oriented conduit providing fluid communication between the vented vessel and the inlet of the evaporator, the evaporator is at a height greater than the vented vessel such that the vertically oriented conduit has a length effective to create a low pressure region within the evaporator;
a vapor condenser comprising a sealed housing having an inlet and an outlet, the inlet of the housing of the vapor condenser in fluid communication with the outlet of the evaporator for receiving the vapor, the outlet of the housing of the vapor condenser for discharging a processed liquid;
a stator disposed in the housing of the vapor condenser, the stator including a protrusion proximate to the inlet of the housing of the vapor condenser, the stator further including at least one ridge extending axially along a length of the stator;
a rotor disposed in the housing of the vapor condenser for rotation about the stator, the rotor including a protrusion proximate to the inlet of the housing of the vapor condenser, the protrusion of the rotor cooperating with the protrusion of the stator to draw the vapor from the evaporator to the vapor condenser, the rotor further including at least one ridge extending axially along a length of the rotor, the ridge of the rotor cooperating with the ridge of the stator to move a mixture of the vapor and the processed liquid towards at least one drain in the rotor where the processed liquid is communicated to the outlet of the housing of the vapor condenser; and
wherein the protrusion of the rotor defines a fan.

16. A vapor based purification system, comprising:
an evaporator having an inlet and an outlet, the inlet of the evaporator for receiving the liquid and the outlet of the evaporator for delivering the vapor a vapor condenser housing having an inlet and an outlet, the inlet of the vapor condenser housing in communication with the outlet of the evaporator for receiving the vapor, the outlet of the vapor condenser housing for discharging a processed liquid;

a vapor condenser disposed in the vapor condenser housing comprising, a stator including a protrusion proximate to the inlet of the vapor condenser housing;

a rotor disposed for rotation about the stator, the rotor including a protrusion proximate to the inlet of the vapor condenser housing, the protrusion of the rotor cooperating with the protrusion of the stator to draw the vapor from the evaporator into the vapor condenser;

at least one of the stator or the rotor including a spiral ridge extending axially along a length of the at least one of the stator or rotor, the other of the at least one of the stator or the rotor including a plurality of ridges extending axially along a length of the other of the at least one of the stator or the rotor and each of the plurality of ridges projecting radially from the other of the at least one of stator or rotor, the plurality of ridges cooperating with the spiral ridge to move a mixture of the vapor and the processed liquid towards at least one drain in the rotor where the processed liquid is communicated to the outlet of the vapor condenser housing; and wherein the rotor includes a plurality of drains disposed along the length of the stator or the rotor.

* * * * *